United States Patent
O'Brien et al.

(10) Patent No.: US 9,578,867 B2
(45) Date of Patent: *Feb. 28, 2017

(54) PORTABLE HEATING SYSTEM AND METHOD FOR PEST CONTROL

(71) Applicant: TECHNOLOGIES HOLDINGS CORP., Houston, TX (US)

(72) Inventors: Timothy S. O'Brien, DeForest, WI (US); Eric P. Camenga, Milton, WI (US)

(73) Assignee: Technologies Holding Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,308

(22) Filed: Apr. 15, 2016

(65) Prior Publication Data

US 2016/0262368 A1 Sep. 15, 2016

Related U.S. Application Data

(63) Continuation of application No. 14/168,535, filed on Jan. 30, 2014, now Pat. No. 9,374,991, which is a
(Continued)

(51) Int. Cl.
*F25B 3/00* (2006.01)
*A01M 1/20* (2006.01)
(Continued)

(52) U.S. Cl.
CPC ............ *A01M 1/2094* (2013.01); *A01M 1/24* (2013.01); *E04B 1/72* (2013.01); *F24H 3/002* (2013.01);
(Continued)

(58) Field of Classification Search
CPC .......... F25B 30/00; F25B 30/02; F25B 30/06; F25B 7/00; F25B 2700/2104; F25B 29/00;
(Continued)

(56) References Cited

U.S. PATENT DOCUMENTS 139,562 A    6/1873  Fewell
919,827 A    4/1909  Cochrane et al.
(Continued)

FOREIGN PATENT DOCUMENTS

CA    2205673    11/1998
DE    4025828     2/1992
(Continued)

OTHER PUBLICATIONS

DeMonte et al., U.S. Appl. No. 13/007,021, USPTO Non-final Office Action, Apr. 15, 2013.
(Continued)

*Primary Examiner* — Ryan J Walters
*Assistant Examiner* — Erik Mendoza-Wilkenfe
(74) *Attorney, Agent, or Firm* — Baker Botts L.L.P.

(57) ABSTRACT

A system for killing pests in an affected area of a structure comprises a heat pump unit placed within an affected area and a thermostatic control. The heat pump unit is configured to receive a flow of water from a faucet, and generate heated air by transferring heat from the flow of water, the heated air being emitted into the affected area in order to raise the temperature of the affected area to a target temperature greater than 120 degrees Fahrenheit. The thermostatic control is configured to monitor a temperature of a flow of water as it is received by the heat pump, monitor a temperature of air, and automatically cease operation of the heat pump when the temperature of the flow of water is above a predefined limit.

19 Claims, 3 Drawing Sheets

Related U.S. Application Data continuation of application No. 13/013,560, filed on Jan. 25, 2011, now Pat. No. 8,720,109.

(51) Int. Cl.
| | |
|---|---|
| *A01M 1/24* | (2006.01) |
| *E04B 1/72* | (2006.01) |
| *F24H 3/00* | (2006.01) |
| *F24H 9/00* | (2006.01) |
| *F25B 30/02* | (2006.01) |
| *F25B 49/02* | (2006.01) |
| *F28D 1/02* | (2006.01) |
| *F28D 1/047* | (2006.01) |

(52) U.S. Cl.
CPC ........... *F24H 9/0057* (2013.01); *F25B 30/02* (2013.01); *F25B 49/022* (2013.01); *F28D 1/024* (2013.01); *F28D 1/0472* (2013.01); *F25B 3/00* (2013.01); *F25B 2400/01* (2013.01); *F25B 2600/025* (2013.01); *F25B 2700/2103* (2013.01)

(58) Field of Classification Search
CPC . F25B 2313/003; F24D 11/0292; F24D 15/04
See application file for complete search history.

(56) References Cited

U.S. PATENT DOCUMENTS

| | | |
|---|---|---|
| 2,051,057 A | 8/1936 | Pettit et al. |
| 2,059,835 A | 11/1936 | Worthing et al. |
| 2,107,268 A | 2/1938 | Avery |
| 2,365,092 A | 12/1944 | Martin |
| 2,401,890 A | 6/1946 | Smith et al. |
| 2,454,296 A | 11/1948 | Woods |
| 2,469,963 A | 5/1949 | Grosjean et al. |
| 2,575,426 A | 11/1951 | Parnell |
| 3,051,464 A | 8/1962 | Yeo et al. |
| 3,537,803 A | 11/1970 | Ignazio |
| 3,638,858 A | 2/1972 | Alms |
| 3,779,230 A | 12/1973 | Mucklerath |
| 3,844,270 A | 10/1974 | Black |
| 3,916,870 A | 11/1975 | Beavers |
| 4,096,376 A | 6/1978 | Macklem |
| 4,253,312 A | 3/1981 | Smith |
| 4,296,727 A | 10/1981 | Bryan |
| 4,341,263 A | 7/1982 | Arbabian |
| 4,351,161 A * | 9/1982 | Jones ................ F24D 11/0221 237/2 B |
| 4,400,950 A | 8/1983 | Knabben |
| 4,422,444 A | 12/1983 | Webb |
| 4,476,920 A * | 10/1984 | Drucker .............. F24D 19/1087 165/242 |
| 4,519,776 A | 5/1985 | De Yoreo et al. |
| 4,737,616 A | 4/1988 | Wen-Ying |
| 4,776,798 A | 10/1988 | Crawford |
| 4,794,908 A | 1/1989 | Hall |
| 4,817,329 A | 4/1989 | Forbes |
| 4,840,220 A | 6/1989 | Umezu et al. |
| 4,869,665 A | 9/1989 | Coppin |
| 4,878,226 A | 10/1989 | McQuoid et al. |
| 4,900,898 A | 2/1990 | King |
| 4,953,320 A | 9/1990 | Nelson |
| 4,958,456 A | 9/1990 | Chaudoin et al. |
| 4,961,283 A | 10/1990 | Forbes |
| 5,046,478 A * | 9/1991 | Clawson ................ F24H 6/00 126/101 |
| 5,052,367 A | 10/1991 | Beavers et al. |
| 5,058,313 A | 10/1991 | Tallon |
| 5,083,918 A | 1/1992 | Potter et al. |
| 5,131,836 A | 7/1992 | Coppin |
| 5,165,883 A | 11/1992 | Van Bemmel |
| 5,191,874 A | 3/1993 | Mcwilliams |
| 5,203,500 A | 4/1993 | Horrne |
| 5,271,242 A | 12/1993 | Addington |
| 5,282,334 A | 2/1994 | Kimura et al. |
| 5,320,163 A | 6/1994 | Stoodley |
| 5,349,778 A | 9/1994 | Chu |
| 5,365,692 A | 11/1994 | Gustafson |
| 5,366,153 A * | 11/1994 | Swenson .................. F24F 3/06 165/236 |
| 5,378,086 A | 1/1995 | Campbell et al. |
| 5,385,299 A | 1/1995 | Zawada |
| 5,460,162 A | 10/1995 | Benzer |
| 5,471,782 A | 12/1995 | Brittell |
| 5,540,273 A | 7/1996 | Polk et al. |
| 5,606,865 A | 3/1997 | Caron |
| 5,636,786 A | 6/1997 | Daneshvar et al. |
| 5,641,463 A | 6/1997 | Langhart |
| 5,647,342 A | 7/1997 | Jamieson et al. |
| 5,678,352 A | 10/1997 | Leitner et al. |
| 5,792,419 A | 8/1998 | Williamson et al. |
| 5,867,935 A | 2/1999 | Brown |
| 5,871,151 A | 2/1999 | Fiedrich |
| 5,915,960 A | 6/1999 | Check et al. |
| 5,918,668 A * | 7/1999 | Trimble .............. F24D 19/1087 165/240 |
| 5,950,720 A | 9/1999 | Klix |
| 5,974,726 A | 11/1999 | Creeger et al. |
| 6,014,966 A | 1/2000 | Stevenson |
| 6,116,232 A | 9/2000 | Valters et al. |
| 6,141,901 A | 11/2000 | Johnson |
| 6,155,160 A | 12/2000 | Hocjbrueckner |
| 6,161,763 A | 12/2000 | Reuter |
| 6,182,453 B1 | 2/2001 | Forsberg |
| 6,296,478 B1 | 10/2001 | Gatley, Jr. |
| 6,308,702 B1 | 10/2001 | Huyghe et al. |
| 6,318,358 B1 | 11/2001 | Gatley, Jr. |
| 6,327,812 B1 | 12/2001 | Hedman et al. |
| 6,363,218 B1 * | 3/2002 | Lowenstein ......... H05B 1/0283 392/498 |
| 6,394,795 B2 | 5/2002 | Fayerman et al. |
| 6,447,737 B1 | 9/2002 | Williamson et al. |
| 6,526,964 B1 | 3/2003 | Potter et al. |
| 6,581,324 B1 | 6/2003 | Creeger et al. |
| 6,588,140 B1 | 7/2003 | Johnson et al. |
| 6,594,944 B2 | 7/2003 | Chura |
| 6,595,200 B1 | 7/2003 | Dai |
| 6,612,067 B2 | 9/2003 | Topp |
| 6,678,994 B2 | 1/2004 | Topp |
| 6,679,079 B2 | 1/2004 | Nagai et al. |
| 6,681,760 B2 | 1/2004 | Topp |
| 6,718,685 B2 | 4/2004 | Bossler |
| 6,772,829 B2 | 8/2004 | Lebrun |
| 6,875,962 B2 | 4/2005 | Uhi et al. |
| 6,880,548 B2 | 4/2005 | Schultz et al. |
| 6,880,549 B2 | 4/2005 | Topp |
| 6,884,065 B2 | 4/2005 | Vandrak et al. |
| 6,892,491 B2 | 5/2005 | Hedman |
| 6,921,261 B2 | 7/2005 | Perry |
| 6,923,173 B2 | 8/2005 | Schonberger |
| 7,100,540 B2 | 9/2006 | Vaughan |
| 7,134,239 B2 | 11/2006 | Barra |
| 7,251,950 B2 | 8/2007 | Matsumoto et al. |
| 7,481,650 B2 | 1/2009 | Mosiewicz et al. |
| 7,614,180 B2 | 11/2009 | Durand |
| 7,682,560 B2 | 3/2010 | Brash |
| 7,690,148 B2 | 4/2010 | Hedman |
| 7,740,987 B2 | 6/2010 | Miyauchi et al. |
| 7,823,579 B2 | 11/2010 | Vandrak et al. |
| 7,908,791 B1 | 3/2011 | Brash |
| 7,926,222 B2 | 4/2011 | Molnar et al. |
| 7,975,657 B2 | 7/2011 | Okayasu |
| 8,221,678 B2 | 7/2012 | Hedman |
| 2001/0004813 A1 | 6/2001 | Hedman |
| 2002/0066223 A1 | 6/2002 | Hedman et al. |
| 2002/0174673 A1 | 11/2002 | Wilkinson |
| 2003/0026727 A1 | 2/2003 | Topp |
| 2003/0029605 A1 | 2/2003 | Lebrun |
| 2003/0061757 A1 | 4/2003 | Askin |
| 2003/0205055 A1 * | 11/2003 | Shahbaz .................. F24F 3/14 62/331 |
| 2004/0028554 A1 | 2/2004 | Hedman |

(56) References Cited

U.S. PATENT DOCUMENTS

| | | |
|---|---|---|
| 2004/0035044 A1 | 2/2004 | Topp |
| 2004/0154213 A1 | 8/2004 | Mosher, II |
| 2004/0237382 A1 | 12/2004 | Durand et al. |
| 2004/0244276 A1 | 12/2004 | Durand et al. |
| 2005/0108920 A1 | 5/2005 | Takenoshita |
| 2005/0220662 A1 | 10/2005 | Hedman |
| 2005/0246942 A1 | 11/2005 | Mueller |
| 2005/0268543 A1 | 12/2005 | Hicks et al. |
| 2006/0010791 A1 | 1/2006 | Topp |
| 2007/0023980 A1 | 2/2007 | Abaraw |
| 2007/0084105 A1 | 4/2007 | Lindsay et al. |
| 2007/0204862 A1 | 9/2007 | Cowan |
| 2007/0258853 A1 | 11/2007 | Burton |
| 2008/0014111 A1 | 1/2008 | Hedman |
| 2008/0156786 A1 | 7/2008 | Choi |
| 2008/0156891 A1 | 7/2008 | Zhou et al. |
| 2008/0202741 A1 | 8/2008 | Lee et al. |
| 2008/0260364 A1 | 10/2008 | Vandrak et al. |
| 2008/0302351 A1 | 12/2008 | Hunter et al. |
| 2008/0314674 A1 | 12/2008 | Kamio |
| 2009/0085713 A1 | 4/2009 | Tsang |
| 2009/0126909 A1 | 5/2009 | Ellsworth |
| 2009/0211148 A1 | 8/2009 | McCarty |
| 2009/0255997 A1* | 10/2009 | Goldmann ............... F24F 3/052 236/1 B |
| 2010/0018228 A1 | 1/2010 | Flammang et al. |
| 2010/0037512 A1 | 2/2010 | Durand |
| 2010/0126705 A1 | 5/2010 | Furui et al. |
| 2010/0294257 A1 | 11/2010 | Thayer et al. |
| 2010/0326129 A1 | 12/2010 | Moriwaki et al. |
| 2011/0108015 A1 | 5/2011 | Jamieson |
| 2011/0197602 A1 | 8/2011 | Abbas et al. |
| 2011/0289825 A1 | 12/2011 | James |
| 2011/0290228 A1 | 12/2011 | Tsunekawa et al. |
| 2011/0290229 A1 | 12/2011 | Manning |
| 2011/0308139 A1 | 12/2011 | James |
| 2012/0102818 A1 | 5/2012 | Rogacki et al. |
| 2012/0180381 A1 | 7/2012 | DeMonte et al. |
| 2012/0204478 A1 | 8/2012 | Gere et al. |
| 2012/0233907 A1 | 9/2012 | Pattison et al. |
| 2012/0255219 A1 | 10/2012 | DeMonte et al. |
| 2012/0255220 A1 | 10/2012 | DeMonte et al. |
| 2012/0304528 A1 | 12/2012 | Hosli et al. |
| 2012/0317870 A1 | 12/2012 | Pratt |

FOREIGN PATENT DOCUMENTS

| | | |
|---|---|---|
| DE | 19746026 | 6/1998 |
| DE | 19741722 | 3/1999 |
| DE | 19950634 | 5/2001 |
| DE | 10300169 | 7/2004 |
| EP | 963694 | 12/1999 |
| GB | 2 280 851 A | 2/1995 |
| JP | 2009072167 | 4/2009 |
| WO | 2009/049389 | 4/2009 |

OTHER PUBLICATIONS

DeMonte et al., U.S. Appl. No. 13/007,021, USPTO Final Office Action, Oct. 24, 2013.
Canadian Intellectual Property Office, Office Action for Application No. 2,885,451, 5 pages, May 19, 2015.
CEA Technologies Inc., The Heat Pump Reference Guide, 4th edition, http://ww.myconserve101.com/documents/HeatPumpReferenceGuide.pdf, Mar. 27, 2007.
European Patent Office Communication dated Apr. 9, 2013 regarding Application No. 11195438.4-1655.
DeMonte et al., U.S. Appl. No. 13/224,998, Non-final Office Actions from U.S. Patent and Trademark Office dated Jan. 11, 2013 and Jan. 24, 2013.
T. R. DeMonte et al., U.S. Appl. No. 13/080,970, Final Office Action from the U.S. Patent and Trademark Office mailed Oct. 26, 2012.
T. R. DeMonte, U.S. Appl. No. 13/224,998, Final office action from the U.S. Patent and Trademark Office mailed Sep. 21, 2012.
T. R. DeMonte, U.S. Appl. No. 13/080,970, Non-final office action from U.S. Patent and Trademark Office mailed May 11, 2012.
T. R. DeMonte, U.S. Appl. No. 13/224,998, Non-final office action from the U.S. Patent and Trademark Office mailed Feb. 1, 2012.
European Patent Office Communication dated Aug. 8, 2012 regarding Application No. 11195438.4-1260.
Pereira et al., "Lethal effects of Heat and Use of Localized Heat Treatment for Control of Bed Bug Infestations," *J. Econ. Entomol.* 2009, 102(3), pp. 1182-1188.
Qarles, W., "Thermal Pest Eradication in Structures," vol. XXVIII, #5/6, May/Jun. 2006, http://www.birc.org/MayJune2006.pdf (Accessed Dec. 30, 2010).
De Monte et al., U.S. Appl. No. 13/007,021, filed Jan. 14, 2011, "Hydronic Heating System and Method for Pest Control".
DeMonte et al., U.S. Appl. No. 13/080,970, filed Apr. 6, 2011 "Self-Contained Heating Unit for Thermal Pest Control".
DeMonte et al., U.S. Appl. No. 13/224,998, filed Sep. 2, 2011 "Self-Contained Heating Unit for Thermal Pest Control".

* cited by examiner

PORTABLE HEATING SYSTEM AND METHOD FOR PEST CONTROL

RELATED APPLICATIONS

This application is a continuation of U.S. application Ser. No. 14/168,535 filed Jan. 30, 2014, entitled "Portable Heating System and Method for Pest Control," which is a continuation of U.S. application Ser. No. 13/013,560, filed Jan. 25, 2011, entitled "Portable Heating System and Method for Pest Control," and is now U.S. Pat. No. 8,720,109 issued May 13, 2014, the entire disclosure of which is hereby incorporated by reference.

TECHNICAL FIELD

This invention relates generally to pest control and more particularly to a portable heating system and method for killing bed bugs in an affected area.

BACKGROUND OF THE INVENTION

It is not uncommon for pests such as bed bugs and other insects to infest structures or other areas that are also inhabited or otherwise used by humans. This is particularly true in enclosed spaces that are located within certain climates and/or enclosed spaces that are frequented by the public. The insects, which generally hide during the day, emerge from cracks and crevices at night to feast on human blood while the human inhabitants are asleep. For example, hotels may become infested with bed bugs or other pests when those insects are brought in by overnight guests. The problem is not isolated to hotels that service over night visitors, however. Other spaces that may become infested include office and commercial buildings, private dwellings, and vehicles. Accordingly, the need exists for effective and efficient systems and methods for killing bed bugs and other pests within an enclosed area. Systems and methods for killing bed bugs and other pests, however, have proven inadequate in various respects.

SUMMARY OF THE INVENTION

According to embodiments of the present disclosure, disadvantages and problems associated with previous systems for killing pests such as bed bugs in an affected area may be reduced or eliminated.

In certain embodiments, a system for killing pests in an affected area includes a heat exchanger unit and an electric heater. The heat exchanger unit is placed within the affected area and is coupled to a faucet. The heat exchanger unit is configured to receive a flow of water from the faucet and to emit heated air by transferring heat from the flow of water to air flowing through the heat exchanger unit. The electric heater further heats the air emitted by the heat exchanger unit to a target temperature greater than 120 degrees Fahrenheit.

Particular embodiments of the present disclosure may provide one or more technical advantages. For example, the temperature within an affected area may be elevated to a temperature suitable for killing bed bugs and other pests without causing damage to the structure or its contents. In particular, the temperature of an affected area may be thoroughly and uniformly heated to a temperature that is greater than 120 degrees Fahrenheit. Such a temperature has been shown to be effective in killing bed bugs and other pests that have infested the area without causing damage to the affected area or its contents.

In certain embodiments, all or a portion of the heat necessary to elevate the temperature of an affected area to a temperature suitable for killing bed bugs and other pests may be extracted from water that is already available to the affected area. For example, a flow of heated water may be supplied from a sink faucet, a shower faucet, a bathtub faucet, or any other suitable source of heated water. Once heat has been extracted from the flow of water, the flow of water may be directed to an available drain, such as a sink, bathtub, or toilet. Because all or a portion of the heat necessary to elevate the temperature of an affected area to a temperature suitable for killing bed bugs is extracted from water that is already available to the affected area, certain embodiments of the present disclosure may allow for heating of affected areas for which alternative sources of heat are unavailable or insufficient (e.g., high rise apartment buildings).

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
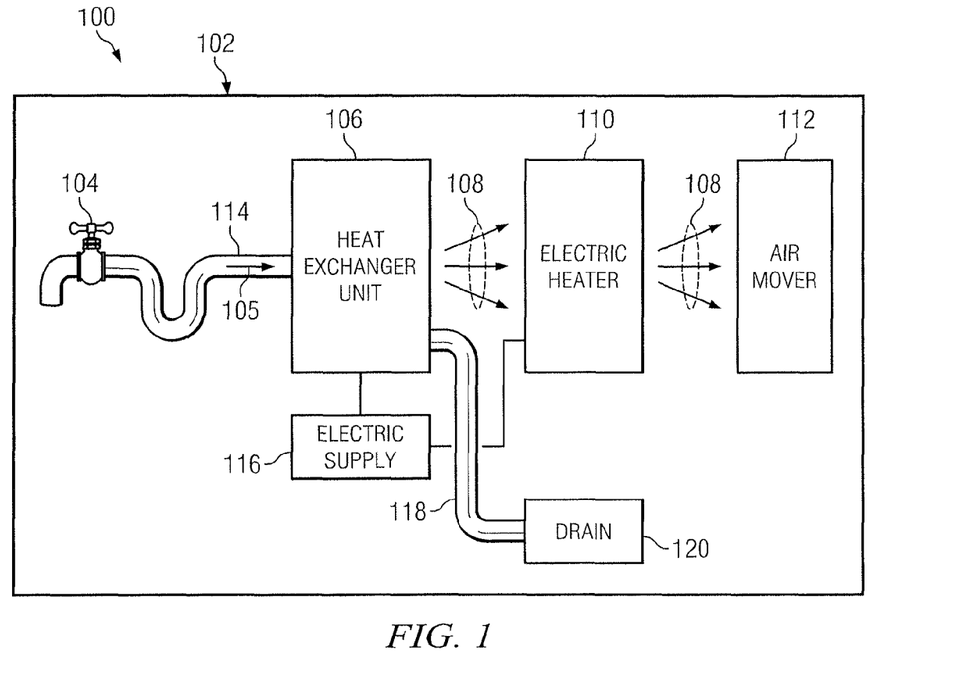
FIG. 1 illustrates an example system for pest control, according to certain embodiments of the present disclosure.

FIG. 1 illustrates an example system 100 for pest control, according to certain embodiments of the present disclosure. In general, system 100 includes equipment and components for heating at least a portion of an affected area 102 and its contents to a temperature sufficient to kill bed bugs and other insects that may have infested the affected area 102. For example, the temperature of affected area 102 may be increased to a temperature that is substantially equal to or greater than 120 degrees Fahrenheit, in certain embodiments. The term "affected area" is intended to include any enclosed space that may become infested with bed bugs or other insects or pests. In certain embodiments, affected area 102 may include a building or structure. For example, affected area 102 may include a hotel, an office space, a commercial building, or a private dwelling such as a house or apartment building. In other embodiments, affected area 102 may include a portion of a building or structure. For example, affected area 102 may include a room in a hotel, an office within an office building, a room within a house, or an apartment with in an apartment building. However, affected area 102 is not limited to a building or structure or portion thereof. Likewise, affected area 102 may include any area requiring treatment for bed bugs or other pests whether that area is interior to or exterior to a building or other structure. Affected area 102 may be considered an acute infestation site where there has been visual confirmation of a nesting area of bedbugs or other insects, or where a trained scent detection dog has alerted to the presence of bedbugs. Generally, a nesting area may include several to dozens of bed bugs.

Although a minimum temperature of 120 degrees Fahrenheit may be sufficient to kill bed bugs and other insects, in some circumstances, it may be desirable to heat the air to a higher temperature. For example, heating the ambient air within affected area 102 to only the minimum temperature may be insufficient to ensure that all contents within affected area 102 are adequately and thoroughly heated throughout to the minimum temperature. Accordingly, in a particular embodiment, the temperature of affected area 102 may be further increased to ensure that hard-to-heat areas and the contents of these areas are thoroughly heated to the minimum temperature of 120 degrees Fahrenheit. In such an embodiment, the temperature of affected area 102 may be increased to a target temperature of at least 140 degrees Fahrenheit. Heating the ambient air to a temperature of 140 degrees or greater may more readily ensure that the entirety of affected area 102 and all of its contents are thoroughly heated to at least the minimum temperature of 120 degrees Fahrenheit that is required to effectively treat the affected area for bed bugs.

Generally, a faucet 104 provides a supply of water 105 that is used as a heat source. The faucet 104 may be within affected area 102 or may be external to affected area 102. The hot water 105 may be transported from faucet 104 via one or more tubes or hoses to a heat exchanger unit 106 within the affected area 102. Heat exchanger unit 106 may transfer the heat from water 105 to the ambient air. Heated air 108 may be emitted to an electric heater 110 that operates to amplify the heat. An air mover 112 may then used to circulate the heated air 108 within affected area 102. Water 105 from the heat exchanger unit may be transported to a drain such as a bathtub, toilet, sink, or in floor drain. As will be described in more detail below, faucet 104, heat exchanger unit 106, electric heater 110, air mover 112, and water 105 received by these components may cooperate to heat affected area 102 to a target temperature that is sufficient to kill pests such as bed bugs and other insects.

In certain embodiments, faucet 104 is a preexisting water source within affected area 102. For example, faucet 104 may include a conventional faucet such as a sink faucet, a shower faucet, a bathtub faucet, or any other suitable source of heated water. In other embodiments, faucet 104 may be a water source external to but proximate to affected area 102. During the treatment of affected area 102, faucet 104 may be turned on such that water 105 is continuously provided to heat exchanger unit 106. Faucet 104 may be turned or otherwise set such that (1) faucet 104 provides the water 105 at the highest possible temperature, and/or (2) faucet 104 provides water 105 at a maximum possible flow rate.

In certain embodiments, water may be supplied to faucet 104 from a water heating unit, such as water heater or boiler, within a building or other structure, the water heating unit being set to heat the supplied water to a temperature that is comfortable for occupants. For example, the water heating unit may be set to a temperature of approximately 120-130 degrees Fahrenheit. Water heated to a temperature within this range may be easily tolerated by occupants of the building or other structure. Accordingly, where water is provided to the faucet 104 from a water heating unit that is set to a temperature of approximately 120-130 degrees Fahrenheit, faucet 104 may provide water 105 to heat exchanger unit 106 at like temperatures. In a particular embodiment, faucet 104 may provide water 105 to heat exchanger unit 106 at a temperature of approximately 125 degrees Fahrenheit.

In other embodiments, the temperature of water 105 may be adjusted based on the temperature to be achieved within affected area 102 during the treatment process. For example, although an ambient air temperature of approximately 120 degrees Fahrenheit may be sufficient in the killing of bed bugs and other insects, a higher temperature may be desired in certain instances. Accordingly, where the structure can be vacated of all occupants or where all occupants can be directed not to use the water provided to the area, the temperature setting of the water heating unit within the structure or other area may be increased. For example, the temperature setting of the water heating unit may be set to a temperature that is substantially equal to or greater than 140 degrees Fahrenheit. In such an embodiment, faucet 104 may provide water 105 to heat exchanger unit 106 at a temperature of at least 140 degrees Fahrenheit.

A hose 114 may be used transport water 105 from faucet 104 to heat exchanger unit 106. Accordingly, a first end of hose 114 may couple to faucet 104, and a second end of hose 114 may couple to heat exchanger unit 106. In certain embodiments, the respective ends of hose 114 may be configured or have an adapter that allows hose 114 to be easily connected to common plumbing fixtures. For example, hose 114 may include a quick-connect adapter having standard threaded plumbing connections to attach to the faucet 104 and the heat exchanger unit 106. The diameter of hose 114 may be selected to handle the volume of water supplied by faucet 104 and for maintaining a desired fluid pressure within hose 114. For example, hose 114 may have a diameter within a range of approximately ¾ to 1 inch, in particular embodiments. It is generally recognized, however, hose 114 may be of any suitable diameter for maintaining the desired fluid pressure within system 100. Likewise, heat exchanger unit 106 may include an inlet port of any size and configuration to facilitate the coupling of hose 114 to heat exchanger unit 106.

Figure 2:
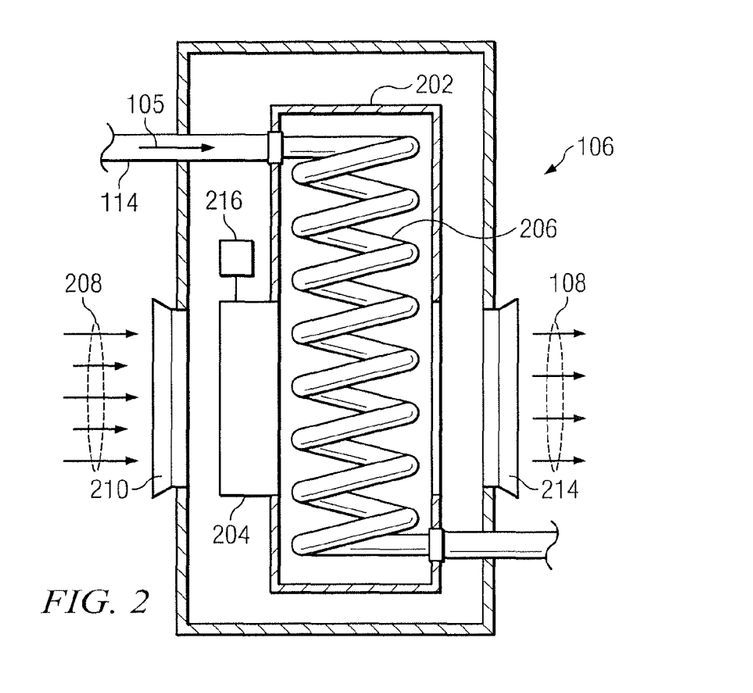
FIG. 2 illustrates an example heat exchanger unit for use in conjunction with the system depicted in FIG. 1, according to certain embodiments of the present disclosure.

FIG. 2 illustrates an example heat exchanger unit 106 for use in conjunction with the system 100 depicted in FIG. 1, according to certain embodiments. As depicted, heat exchanger unit 106 includes both a heat exchanger component 202 and a power fan 204, which may be powered by an electric supply 116. Heat exchanger component 202 may include a fluid-to-air heat exchanger or radiator that transfers thermal energy from fluid 105 to air that is blown through heat exchanger component 202 by fan 204. In this manner, heat exchanger unit 106 may be used to heat the ambient air in affected area 102 to the desired temperature. Where heat exchanger unit 106 includes both a heat exchanger component 202 and a power fan 204, heat exchanger unit 106 may be referred to as a "fan coil."

Specifically, and as discussed above, water 105 is received by heat exchanger unit 106 via supply line 114. The heated water 105 is received at a first temperature and is circulated through one or more tubes or pipes 206 in heat exchanger component 202. While water 105 is being circulated through pipe coil 206, for example, fan 204 is operated to draw in ambient air 208 from the area surrounding heat exchanger unit 106. The air 208 may be drawn in through an opening 210 and may be received at a second temperature that is generally equal to the temperature of the ambient air within affected area 102. As the air 208 is blown across pipe coil 206 of heat exchanger component 202, the heat in water 105 conducts to the outer surface of pipe coil 206 and is transferred into the cooler ambient air 208. The difference in the temperature between the heated water 105 at the first temperature and the ambient air 208 at the second temperature may cause the temperature of ambient air 208 to increase as it is blown over pipe coil 206 by fan 204. The heated air 108 then exits heat exchanger unit 106 through an exit opening 214 and is pushed by fan 204 into affected area 102.

In certain embodiments, heat exchanger unit 106 may include a thermostat 216 for controlling heat output. Thermostat 216 may operate to measure the temperature of ambient air 208 as it is being received by heat exchanger unit 106. Thermostat 216 may also be used to selectively control fan 204 in response to the temperature of ambient air 208 as it is received by heat exchanger unit 106. Specifically, in certain embodiments, thermostat 216 may be set to cycle fan 204 off when the temperature of air 208 being received exceeds an upper limit. Thermostat 216 may also be set to cycle fan 204 on when the temperature of air 208 being received dips below a lower limit. For example, where a target temperature in the range of 135 to 145 degrees Fahrenheit is desired for the killing of bed bugs within affected area 102, thermostat 216 may be set to cycle off fan 204 when the temperature of air 208 being received in opening 210 exceeds 145 degrees Fahrenheit. Thermostat 216 may be then be set to cycle fan 204 on when the temperature of air 208 being received in opening 210 dips below 135 degrees Fahrenheit. Alternatively, where a target temperature of approximately 140 degrees Fahrenheit is desired, thermostat 216 may be set to cycle on fan 204 when the temperature of the ambient air 208 being received by heat exchanger unit 106 is equal to or below 140 degrees Fahrenheit and cycle off fan 204 when the temperature of ambient air 208 being received by heat exchanger unit 106 is above 140 degrees Fahrenheit. As will be described in more detail below, an infrared and/or wireless thermometer may be used to verify that affected area 102 is thoroughly heated to the desired temperature.

Because heat exchanger unit 106 operates to transfer heat from water 105 to the ambient air in affected area 102, the air 108 being emitted by heat exchanger unit 106 is of a higher temperature than the air being received by heat exchanger unit 106. In some embodiments, heat exchanger unit 106 may be sufficient by itself to thoroughly heat the affected area 102 to the target temperature. For example, where the temperature of water 105 is substantially equal to or greater than 140 degrees Fahrenheit, heat exchanger unit 106 may efficiently heat affected area 102 to a target temperature that is greater than 120 degrees Fahrenheit. Even where the temperature of water 105 is less than 140 degrees Fahrenheit, heat exchanger unit 106 may be sufficient to heat affected area 102 to the target temperature if allowed to run long enough.

In certain embodiments, however, it may be desirable to incorporate one or more additional heat sources into system 100. Additional heat sources may allow the target temperature to be achieved in a more efficient and more timely manner. Returning to FIG. 1, system 100 is depicted as including an electric heater 110 as an additional heat source. Electric heater 110 may include any electrical appliance that converts electrical energy into heat. In a particular embodiment, an electrical resistor or other electrical heating element may operate to convert the electrical energy received from an electric supply 116 into heat energy. Electric supply 116 may include one or more A/C electrical outlets. Accordingly, in certain embodiments, electric heater 110 may be configured to plug into a standard 120V, 208V, 230V, or any other suitable electrical outlet. Where multiple components of system 100 require electricity from electric supply 116, the components may be plugged into outlets on different branch circuits. For example, heat exchanger unit 106 may be plugged into an outlet on one branch circuit while electric heater 110 is plugged into an outlet on another branch circuit.

When included in system 100, electric heater 110 may operate to further increase the temperature of air 108 emitted by heat exchanger unit 106. For example, electric heater 110 may be used to bring the temperature of the ambient air in affected area 102 up to the target temperature at a faster rate than in a system that has only a heat exchanger unit 106 as a heat source. Additionally or alternatively, where the temperature of water 105 is not high enough to effectively bring the temperature of the affected area 102 to the target temperature, electric heater 110 may operate to "boost" or "amplify" the heated air emitted by heat exchanger unit 106. For example, where the temperature of water 105 is less than 140 degrees Fahrenheit, in certain embodiments, electric heater 110 may be used to for amplifying the heat emitted by heat exchanger unit 106 to allow the ambient air in the affected area 102 to be brought up to the target temperature.

In certain embodiments, the temperature of the air and/or water may be monitored to prevent heat exchanger unit 106 becoming counter productive. For example, as the temperature of the ambient air within affected area 102 surpasses the temperature of water 105 being received by heat exchanger unit 106, the operation of heat exchanger unit 106 may actually become counterproductive. Specifically, since heat exchanger unit 106 operates to transfer heat from the hotter medium to the cooler medium, as the temperature of the air surpasses the temperature of fluid 105, heat exchanger unit 106 may actually begin to transfer heat from the hotter air to water 105 rather than from the water 105 to the air as intended.

Accordingly, in certain embodiments, heat exchanger unit 106 may include a thermostatic control for monitoring the periodic, continual, or on-demand monitoring of the temperatures of water and/or air being received by heat exchanger unit 106. If the thermostatic control detects that the temperature of the ambient air is less than the temperature of water 105, the flow of water to heat exchanger unit 106 may be maintained. However, where the thermostatic control detects that the temperature of the ambient air has exceeded the temperature of water 105, the flow of water to heat exchanger unit 106 may be stopped. For example, where the temperature of water 105 is 120 degrees Fahrenheit, the flow of water may be stopped when the temperature of the air within affected area exceeds 120 degrees Fahrenheit. In particular embodiments, a person responsible for performing the treatment may enter affected area 102 and turn off faucet 104 that is supplying water 105 to heat exchanger unit 106. Alternatively, heat exchanger unit 106 may include a valve that is automatically or manually closed to prevent the flow of water 105 to heat exchanger unit 106 when the temperature of the ambient air exceeds that of water 105.

In certain embodiments, affected area 102 may also include at least one air mover 112 positioned proximate to heat exchanger unit 106 and/or electric heater 110 for further distributing the heat emitted by heat exchanger unit 106 and/or electric heater 110. Air movers 112 may include standard propeller type fans or any other suitable devices for producing a current of air that may be used to circulate and prevent rising of the air emitted by heat exchanger 106 and/or electric heater 110.

In certain embodiments, the output side of air mover 112 may be configured to direct air toward hard to heat areas and/or contents of affected area 102. For example, affected area 102 may include an exterior wall, the outside of which may be exposed to cold outside temperatures. As a result, the exterior wall may be harder to heat than certain other portions of affected area 102. An air mover 112 may therefore be positioned to direct heated air toward the exterior wall in order to more effectively heat the exterior wall.

In certain embodiments, the output side of air mover 112 may be configured to direct air output by air mover 112 along the floor of affected area 102 to further aid in the circulation of heated air and prevention of temperature stratification (as it is generally recognized that heated air 108 will rise as it exits heat exchanger unit 106 and/or electric heater 110). For example, the configuration of output side of air mover 112 may be such that the heated air is directed towards the baseboards or floor of affected area 102. In certain embodiments, the output side of air mover 112 may include a modified circle that includes on elongated corner configured to direct air in a generally downward direction. An example of such an air mover may be that sold under the name Phoenix Axial Air Mover with FOCUS™ Technology or Quest Air AMS 30 by Therma-Stor, L.L.C., which is described in U.S. Pat. No. 7,331,759 issued Marco A. Tejeda and assigned to Technologies Holdings Corp. of Houston, Tex.

Although FIG. 1 depicts only a single air mover 112 as being included in system 100, one or more additional air movers 112 may also be selectively positioned relative to heat exchanger 106, electric heater 110, or another air mover 112 to promote the circulation of air through affected area 102 in a desired direction. For example, air movers 112 may be positioned relative to heat exchanger unit 106 and/or electric heater 110 such that a clock-wise or counter-clock-wise airflow pattern is achieved through affected area 102. Additionally, one or more air movers 112 may be positioned along walls and pointed in a direction to further facilitate the desired circulation pattern. One or more air movers 112 may be positioned to promote circulation through closets or other hard-to-heat areas within affected area 102. For example, sliding closet doors may be moved to a center position in the doorway. An air mover 112 may then be positioned to blow the heated air 108 into the opening on one side of the door and allowed to exhaust out the opening on the other side of the door.

As described above, hot water 105 may be transported to heat exchanger unit 106 and then through a pipe coil 206 (shown in FIG. 2). As described above, heat exchanger units 106 may receive the water 105 at a temperature that is greater than 120 degrees Fahrenheit, in certain embodiments. However, as heat exchanger unit 106 transfers the thermal energy in water 105 to air 208 that is received by heat exchanger unit 106, the temperature of water 105 may decrease. For example, the temperature of water 105 may decrease approximately 10 degrees as the fluid passes through heat exchanger unit 106. Accordingly, where water 105 is received by heat exchanger unit 106 at a temperature on the order of 120 to 130 degrees Fahrenheit, water 105 may exit heat exchanger unit 106 at a temperature on the order of approximately 110 to 120 degrees Fahrenheit. As another example, where water 105 is received by heat exchanger unit 106 at a temperature that is substantially equal to 140 degrees Fahrenheit, water 105 may exit heat exchanger 106 at a temperature that is substantially equal to 130 degrees Fahrenheit. A design of heat exchanger unit 106 incorporating a counter flow design for the flow of water and air may be preferred to provide maximum heat exchange between the fluids.

As depicted in FIG. 1, a hose 118 may be used to transport water 105 from heat exchanger unit 106, in certain embodiments. Accordingly, a first end of hose 118 may couple to heat exchanger unit 106, and a second end of hose 118 may be positioned proximate a drain 120. At least one of the respective ends of hose 118 may include "quick-connect" coupling to attach to heat exchanger unit 106. The diameter of hose 118 may be selected to handle the volume of water being expelled by heat exchanger unit 106. For example, hose 118 may have a diameter within a range of approximately ¾ to 1 inch, in particular embodiments. It is generally recognized, however, hose 118 may be of any suitable diameter for removing water 105 from system 100. Likewise, heat exchanger unit 106 may include an outlet port of any size and configuration to facilitate the coupling of hose 118 to heat exchanger unit 106.

In a particular embodiment, drain 120 may include the toilet. For example, the second end of hose 118 may be positioned inside the toilet such that water expelled by heat exchanger unit 106 is pushed down the toilet and out of affected area 102. In other embodiments, drain 120 may include any one of a sink drain, shower drain, bathtub drain, or a floor drain. In still other embodiments, drain 120 could include an open window. Thus, though the term "drain" is used, the term refers to any mechanism for removing water 105 from the system. In certain embodiments, the second end of hose 118 may be adapted for or connected to a device to insure that the second end of hose 118 remains in position relative to drain 120 to prevent hose 118 from becoming dislodged and causing water damage to affected area 102.

Some items or areas within affected area 102 may be considered hard to heat areas. Such items or areas may include items stored in closets and drawers. Large soft items such as couch cushions and mattresses may also be considered hard-to-heat items. Hard-to-heat items may not reach the temperature required to kill the bed bugs or other pests during the treatment process unless adequate steps are taken to ensure complete and thorough heating. Accordingly, additional measures may be taken to ensure thorough distribution of heat through affected area 102 and its infested contents, in some instances.

As one example, heat from the hoses carrying water 105 may be transferred to hard-to-heat areas and items. Specifically, one or more of hose 114 and/or hose 118 may be coiled in a pile. The coiled hose 114 or 118 may be placed in a hard-to-heat area such as a closet or a corner. The hoses 114 and 118, which transport hot water 105 may transfer heat that may be used to elevate the temperature of a portion of affected area 102 that might otherwise not reach the desired temperature. Since hose 114 may transport water at a higher temperature than hose 118, hose 114 may be especially effective in providing additional thermal energy to hard-to-heat areas.

It is also recognized that tightly packed contents within affected area 102 may be resistant to being heated completely throughout. This may be particularly true for the contents within closets and drawers. For example, items hung on hangers that are closely packed together may be heated to the desired temperature on some exposed surfaces but the centers of such items may not reach temperatures required to kill any bugs or other pests located on such items. To ensure thorough heating, the items within closets or other tight spaces may be separated such that each item may be sufficiently enveloped in the heat emitted from system 100. Similarly, stacked articles such as clothing or towels may be separated so that the items do not touch one another. As a result, heated air may more readily circulate around and through the items.

As another example, furniture may be positioned at least six to 12 inches away from walls to facilitate air flow into the furniture and through the room. Additionally, the cushions from a couch may be removed and separated. Mattresses and box springs may be separated from one another and turned on their sides and propped against each other to form an upside down "V". Positioning the mattress and box springs in this manner facilitates air flow across the surfaces having the most surface area.

In some instances, merely separating the items may not ensure thorough and complete heating of the articles. A more effective method for providing thorough and complete treatment of the items may include placing the items directly on the hoses 114 and 118 that are used to transport water 105. Accordingly, items may be removed from closets and drawers in some instances. Likewise, items that are stacked or piled may be separated. The items from the closets, drawers, and piles may then be placed on top of hoses 114 and 118. As just one example, the cushions from a couch or other piece of furniture may be removed and placed on the hoses. Heat may then be transferred directly through the hoses into the couch cushions or other articles. Bed bugs or other pests that have infested the couch cushions may be killed when the couch cushions absorb enough heat from the hose to raise the internal temperature of the couch cushion to a temperature greater than 120 degrees Fahrenheit.

Additionally or alternatively, a person responsible for performing the treatment of affected area 102 may enter the affected area 102 and rearrange hard-to-treat items midway through the treatment process. Stated differently, a person may enter the affected area 102 and specifically expose its contents to the high temperature ambient air in the affected area 102. For example, midway through the treatment process, the person may individually expose articles such as clothing, pillows, bedding, towels, and other soft items to the high temperature ambient air. Where the ambient air in affected area 102 has reached the required temperature for killing the bed bugs or other pests, exposing the items to the high temperature ambient air may increase the internal temperature of the item to a level sufficient to rid the item of the bed bugs or other insects.

Various modifications may be made to system 100. For example, though target temperatures of at least 120 and 140 degrees Fahrenheit are described above, these are merely examples of suitable temperatures that may be used to effectively rid an affected area 102 of a bed bug or other insect infestation. Additionally, although water source 104 is described as including a preexisting water source within enclosed area 102, it is generally recognized that any source of hot water may be used in conjunction with the system 100 depicted in FIG. 1. Likewise, though water is described as providing the heat source for system 100, it is recognized that ethylene glycol, a combination of water and ethylene glycol, or any other fluid appropriate for convective heat transfer may be used.

As still another example modification to system 100, it is recognized that it multiple heat exchanger units 106 and electric heaters 110 may improve the efficiency and effectiveness of system 100, in certain embodiments. For example, the number of heat exchanger units 106 and electric heaters 110 provided in an affected area 102 may depend upon the square feet to be treated and/or the volume or flow rate of water 105 that is provided by faucet 104. Other factors, such as whether the affected area 102 is above or below grade and whether the affected area 102 is cluttered with an excessive amount of contents, may also affect the number of heat exchanger units 106 and electric heaters 110 that should be included in system 100.

Figure 3:
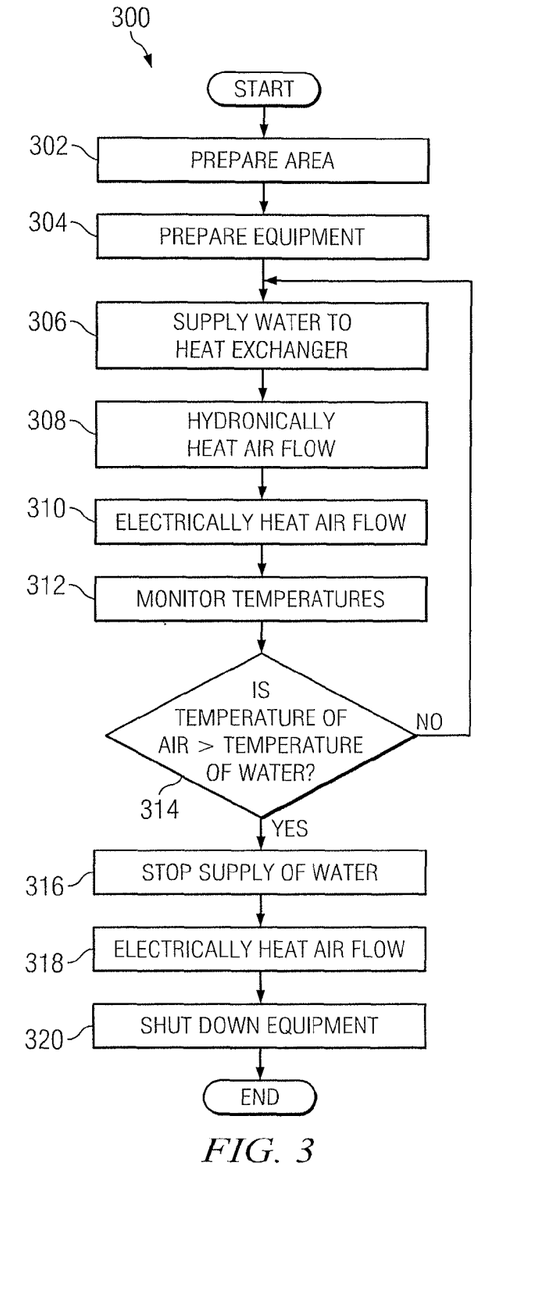
FIG. 3 illustrates an example method for pest control, according to certain embodiments of the present disclosure.

FIG. 3 illustrates an example method 300 for pest control, according to certain embodiments. The method begins with the preparation of the affected area at step 302. In a particular embodiment, preparing the affected area 102 may include capping any sprinkler heads with insulating caps. Insulating caps may include a hollow, modified-hemispherical shaped Styrofoam cover that is attached to the sprinkler head. In certain embodiments, dry-ice can be placed inside the insulating cap to cool the sprinkler heads during the treatment process and further ensure that the sprinkler heads will not trigger during the treatment process. Additionally, preparing the affected area may include removing heat sensitive contents from the infested area. Heat sensitive contents may include any material, equipment, or other contents that could be harmed by temperatures that reach or exceed approximately 120 degrees Fahrenheit. Items that fall within this category may be treated separately offsite.

At step 304, the equipment used in the treatment process is prepared. Preparation of the equipment may include positioning heat exchanger unit 106 within the affected area 102. Additionally, preparing the equipment may include connecting a hose 114 to both of a faucet 104 and heat exchanger unit 106. Additionally, a hose 118 may be connected to heat exchanger unit 106 and then positioned proximate to a drain. Further preparation of the equipment may include placing electric heater 110 and air mover 112 in the appropriate locations within affected area 102. Heat exchanger unit 106 and air movers 112 may then be plugged into electric supply 116 and powered on.

Additional preparations may include the placement of one or more infrared and/or wireless thermometers within affected area 102. For example, infrared and/or wireless thermometers may be placed in the more insulated areas that are harder to thoroughly heat. For example, the thermometers may be placed in corners where poor air flow is anticipated. The thermometers may also be placed under furniture or under stacks of clothing or other soft articles. In certain embodiments, wireless thermometers may communicate wirelessly with one or more computers or other control centers. Wireless data-logging software may be used to record the internal temperature of affected area 102 both prior to and during the treatment process.

At step 306, water 105 is supplied to heat exchanger unit 106. Specifically, and as described above, a faucet 104 may be turned to the hottest setting. Faucet 104 may also be turned on at full volume. The hot water 105 may then be transported from faucet 104 to heat exchanger unit 106. Heat exchanger unit 106 operates to hydronically heat the ambient air in the affected area 102, at step 308. Specifically, heat exchanger unit 106 may operate to increase the temperature of ambient air within affected area 102. In a particular embodiment, the heat exchanger unit 106 may transfer the heat in water 105 to the ambient air that is blown through heat exchanger unit 106.

In certain embodiments, heat exchanger unit 106 receives water 105 at a first temperature that may be equal to or greater than 120 degrees Fahrenheit. In contrast, the ambient air 208 may be received by heat exchanger unit 106 at a second temperature. At the beginning of the treatment process, the temperature of ambient air 208 that is received by heat exchanger unit 106 may be substantially equal to normal room temperature. The temperature difference between water 105 at the first temperature and ambient air 208 results in heat transfer from water 105 to ambient air 208 as it is blown through heat exchanger unit 106.

At step 310, the air emitted by heat exchanger unit 106 is electrically heated. In certain embodiments, an electrical resistance heater may be used to further increase the temperature of the ambient air within affected area 102. Electric heater 110 may operate to "boost" or "amplify" the heat generated by heat exchanger unit 106. One or more air movers 112 may then be used to promote the distribution of heated air that is emitted by one or both of heat exchanger unit 106 and electric heater 110. The heated air may be cycled through the room and may be returned to heat exchanger unit 106 where it is again pushed through heat exchanger unit 106 to result in a further increase in the temperature of the air. Air may be circulated through system 100 in this manner until the combination of heat exchanger unit 106 and electric heater 110 results in the temperature of the ambient air being raised to a target temperature greater than 120 degrees Fahrenheit.

At step 312, the temperatures of the ambient air in affected area 102 and/or the temperature of water 105 may be monitored. For example, thermostats, infrared thermometers, and/or wireless thermometers may be used to determine the temperature of water 105 supplied to heat exchanger unit 106 and/or the temperature of the air within affected area 102. The temperature of water 105 may be measured as it is leaving faucet 104, as it is entering or exiting heat exchanger unit 106, or at any other point prior to exiting system 100. The temperature of ambient air may be measured as it is entering heat exchanger unit 106, as it is leaving heat exchanger unit 106, as it is entering electric heater 110, as it is exiting electric heater 110, or at any location within affected area 102.

In a particular embodiment, heat exchanger unit 106 may include a thermostatic control allowing a user to set a desired temperature level for the air being received by heat exchanger unit 106. In other embodiments, the thermostatic control may be remote from the heat exchanger unit 106 such that the temperature of a specific portion of affected area 102 to be monitored and controlled. Additionally or alternatively, multiple thermometers or thermostatic controls may be provided at multiple locations within affected area 102 to allow the different components of system 100 to be controlled separately. One or more of the thermostats, thermometers, or controls may act as a "high limit" to prevent overheating of temperature sensitive regions with affected area 102. The monitoring of the temperatures of water 105 and air may be continuous, periodic, or as demanded.

At step 314, a determination may be made as to whether the temperature of the ambient air is greater than the temperature of water 105. Such a determination may be made continuously, periodically, or as demanded and may be appropriate where the desired target temperature for the affected area 102 is greater than the temperature of water 105 that is supplied to heat exchanger unit 106. For example, such a determination may be appropriate where the temperature of water 105 is 120 degrees Fahrenheit but a target temperature of greater of than 120 degrees Fahrenheit is desired for the ambient air within affected area 102. As the temperature of the ambient air within affected area 102 surpasses the temperature of water 105, the operation of heat exchanger unit 106 may actually be counterproductive since heat exchanger unit 106 generally operates to transfer heat from the hotter medium to the cooler medium. In such a scenario, operating heat exchanger unit 106 after the temperature of the air surpasses the temperature of fluid 105 may actually result in the transfer of heat from the hotter air to water 105 rather than the continued heating of the ambient air.

If it is determined, at step 314, that the temperature of the air is not greater than the temperature of water 105 being supplied to heat exchanger unit 106, the method returns to step 306. The supply of water 105 to heat exchanger unit 106 is maintained, and the air is hydronically and electrically heated at steps 308 and 310, respectively. The method may continue in this manner cycling through steps 306-314 until a determination is made at step 314 that the temperature of ambient air is greater than the temperature of water 105 being supplied to heat exchanger unit 105. At such time, the supply of water 105 to heat exchanger unit 106 may be stopped. For example, a person responsible for performing the treatment may enter affected area 102 and turn off faucet 104 that is supplying water 105 to heat exchanger unit 106. As another example, heat exchanger unit 106 may include a valve that is automatically or manually closed to prevent the flow of water 105 to heat exchanger unit 106 when the temperature of the ambient air exceeds that of water 105.

At step 318, the electric heating of the air is continued until the temperature of ambient air reaches the target temperature. As described above, a target temperature that is greater than 120 degrees Fahrenheit may be sufficient to kill bed bugs and other insects within affected area 102, in certain embodiments. However, a target temperature of greater than 140 degrees Fahrenheit may be desired to ensure that the entire area and its contents are thoroughly heated to a temperature greater than the minimum temperature required.

After the target temperature has been maintained for a sufficient amount of time to result in the killing of the bed bugs and/or other pests, a shut down of the equipment may be initiated at step 320. If water 105 is being supplied to heat exchanger unit 106, the flow of water 105 may be stopped. Heat exchanger unit 106 and electric heater 110 may be turned off. Any remaining water 105 in system 100 may be drained out of the system components and routed to drain 120. To initiate the cooling of affected area 102 and its contents, air mover 112 may be repositioned. For example, an air mover 112 may be used to blow the heated air out of affected area 102. Additionally or alternatively, an air mover 112 may be positioned to blow cooler air into the affected area 102.

In certain embodiments, the flow of water 105 may be maintained. However, the temperature of the water may be adjusted. By switching the faucet 104 to cold water, for example, hose 114 can deliver cold water 105 to heat exchanger unit 106 transferring heat from the ambient air to the water 105. This may cool the affected area more quickly if the heated air can not be easily exhausted from the affected area. Hoses 114 and 118 may be removed when they have cooled enough to be comfortably handled. Finally, the equipment may be removed from affected area 102, and the contents of affected area 102 may then be returned to their original places.

Figure 4:
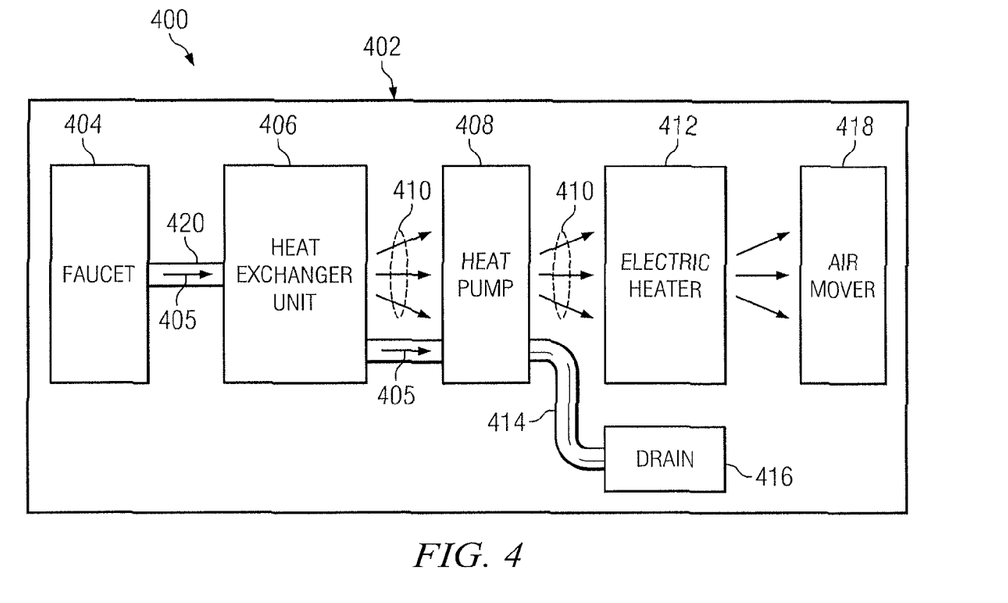
FIG. 4 illustrates an example heat pump system for pest control, according to certain embodiments of the present disclosure.

FIG. 4 illustrates an example heat pump system 400 for pest control, according to certain embodiments of the present disclosure. In general, system 400 includes equipment and components for heating at least a portion of an affected area 402 and its contents to a temperature sufficient to kill bed bugs and other insects that inhabit the affected area 402. Similar to system 100 that is described above with regard to FIG. 1, the components of system 400 cooperate to increase the temperature of affected area 402 and the contents contained therein to result in killing bed bugs and other insects or pests. In certain embodiments, for example, the temperature of affected area 402 may be increased to a temperature that is substantially equal to or greater than 120 degrees Fahrenheit. In a particular embodiment, the temperature of affected area 402 may be increased to a temperature that is equal to or greater than 140 degrees Fahrenheit.

Similar to system 100 described above, a water source 404 provides a supply of water 405 via one or more hoses to a heat exchanger unit 406 within the affected area 402. Faucet 404, water 405, and heat exchanger unit 406 may be substantially similar to faucet 104, water 105, and heat exchanger unit 106 described above. As such, those components are not described in detail with respect to FIG. 4. However, because a system 400 incorporating heat pump 408 may more efficiently and more effectively increase the temperature of the ambient air of affected area 402 than a system without heat pump 408, the temperature of water 405 entering system 400 may be lower than that described above. For example, water 405 may be received by system 400 at a temperature that is substantially equal to or greater than 45 degrees Fahrenheit, in certain embodiments.

Additionally, whereas water 105 exiting heat exchanger unit 106 is directed out of system 100, water 405 is directed to a heat pump 408 after exiting heat exchanger unit 406. Likewise, whereas heated air 108 exiting heat exchanger unit 106 is directed to a electric heater 110, heated air 410 is directed to heat pump 408, which is then used to further increase the temperature in heated air 410.

Figure 5:
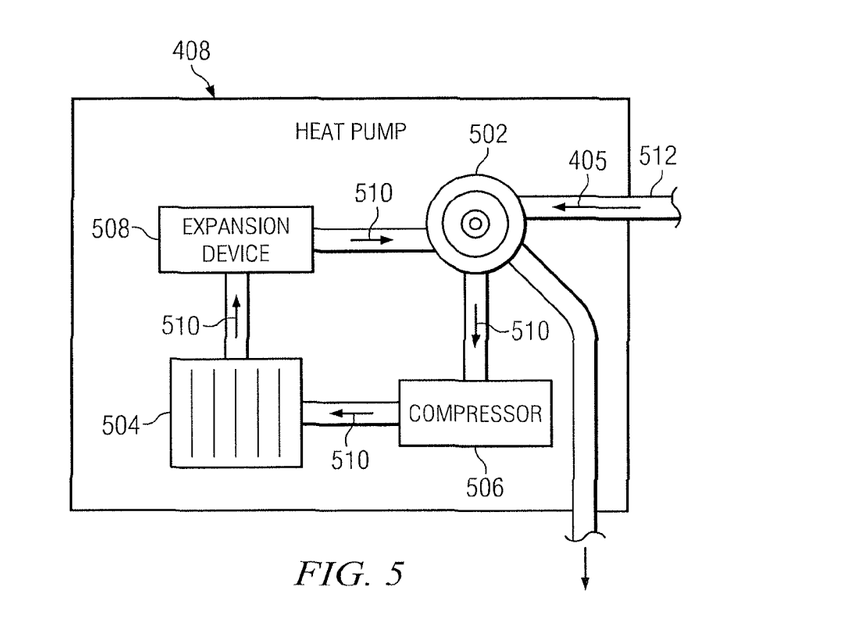
FIG. 5 illustrates an example heat pump unit for use in conjunction with the heat pump system depicted in FIG. 4, according to certain embodiments of the present disclosure.

FIG. 5 illustrates an example heat pump unit 408 for use in conjunction with the heat pump system 400 depicted in FIG. 4, according to certain embodiments. As depicted, heat pump unit 408 includes an evaporator component 502, a condenser component 504, a compressor 506, and an expansion device 508. Evaporator component 502 operates to transfer the heat within water 105 to refrigerant 510. The heat within refrigerant 510 is then transferred to air that is blown through condenser component 504. In this manner, heat pump 408 may be used to "boost" or "amplify" the heat generated by heat exchanger unit 406. As a result, the temperature of the ambient air in affected area 402 may be more efficiently and more effectively brought up to the target temperature.

In certain embodiments, heat pump 408 may operate to produce up to three times more heat than a system such as system 100 that does not have a heat pump 408 and relies solely on a heat exchanger unit and an electrical heater for the generation of heat. Stated differently, whereas an electrical heater that is powered by a 115 V electrical outlet may generate only 4500 BTUs of heat, heat pump that is powered by the same electrical outlet may generate approximately 15,000 BTUs of heat.

Specifically, water 405 is received by heat pump 408 via a supply line 512. The heated water 405 is received at a first temperature and is circulated through evaporator component 502. Evaporator component 502 operates to transfer heat from water 405 to a refrigerant 510 that is received from the expansion device 508. Specifically, refrigerant 510 enters evaporator component 502 while in a liquid state. While in evaporator component 502, refrigerant 510 absorbs heat from water 405. As a result, refrigerant 510 is transformed from a liquid state to a vapor state. The vaporous refrigerant 510 is then directed to the compressor 506.

The compressor 506 compresses the refrigerant 510 to a higher temperature and pressure. Condenser component 504 is configured to transfer heat from the vaporous refrigerant 510 to air that is flowing through condenser component 504. In certain embodiments, condenser component 504 receives air 410 emitted by heat exchanger unit 406 and operates to further increase the temperature of the air 410 by transferring the heat from the vaporous refrigerant 510 to air 410. As the heat is transferred from refrigerant 510 to air 410, refrigerant 510 again undergoes a state change. Specifically, the refrigerant 510 may be transformed from the vapor state to the liquid state. The air is then emitted from heat pump 408. The liquid refrigerant 510 is returned to the expansion device 508. A compressor 506 may operate to cycle the refrigerant 510 through heat pump 408.

Some heat pump designs may not tolerate water temperatures above a predefined limit. For example, some heat pump designs may not tolerate water temperatures above 90 degrees Fahrenheit. If the evaporator temperature becomes too high, compressor 506 may overheat and stop functioning. In order to prevent this failure, heat pump 408 may include sensors and/or controls for protecting the compressor 506 from overload in certain embodiments. The sensors and controls may operate to monitor and control the flow rate and the temperature of water entering the evaporator component 502 of heat pump 408. Though the sensors and controls may be integrated as part of heat pump 408, it is recognized that the sensors and controls may be an external device in certain embodiments.

In a particular embodiment, for example, heat pump 408 may include a mechanical or electronic water tempering valve or a thermostatic mixing valve. The tempering valve may be operated mechanically or electronically and may used to maintain the temperature of water within a predefined operating range. In certain embodiments, the tempering valve may include two quick-connect or other connections for receiving both hot and cold water through two respective hoses. The tempering valve may then mix the hot and cold water from the two supplies to maintain a specified output water temperature. The specified output water temperature may be adjustable by a user or it may be fixed, as desired. The mixed hot and cold water may be directed to a suitable drain after it leaves heat pump 408.

As an alternative to a water tempering valve or in addition to a water tempering valve, one or more sensors or controls may be used to prevent the evaporator component 502 from failing. For example, the sensors or controls may be used to maintain the temperature of the heat pump evaporator component 502 within a specified range by controlling the water flow rate provided to heat pump 408. In particular embodiments, the valve or metering device may include an electrical or mechanical valve that may be adjustable by a user or fixed, as desired. Because the valve or metering device that controls the flow rate does not require a connection to a cold water supply in addition to the hot water supply connection previously described, this mechanism for preventing heat pump failure may be preferred to a water tempering valve, in certain embodiments where the structure has a limited number of fixtures.

The heat pump 408 may include a mechanism for selectively controlling the operation of compressor 506 in response to the temperature of water 405. For example, the control may result in the reduction of compressor capacity or a complete powering down of compressor 506 when the temperature of water 405 becomes too low, in certain embodiments.

Returning to FIG. 4, water 405 exits heat pump 408 via a hose or other drain line 414. Hose 414 may be used to transport water 405 out of system 400, in certain embodiments. Accordingly, a first end of hose 414 may couple to heat pump 408, and a second end of hose 414 may be positioned proximate a drain 416. Similar to drain 120 of system 100, drain 416 may include a toilet, in a particular embodiment. Thus, the second end of hose 414 may be positioned inside the toilet such that water expelled by heat pump 408 is pushed down the toilet and out of affected area 402. In other embodiments, drain 416 may include any one of a sink drain, shower drain, bathtub drain, or a floor drain. In still other embodiments, drain 416 could include an open window or other outlet. Thus, though the term "drain" is used, the term refers to any mechanism for removing water 405 from system 400.

In certain embodiments, at least one of the respective ends of hose 414 may include "quick-connect" coupling to attach to heat pump 408. The diameter of hose 414 may be selected to handle the volume of water being expelled by heat pump 408. For example, hose 414 may have a diameter within a range of approximately ¾ to 1 inch, in particular embodiments. It is generally recognized, however, hose 414 may be of any suitable diameter for removing water 405 from system 400. Likewise, heat pump 408 may include an outlet port of any size and configuration to facilitate the coupling of hose 414 to heat pump 408.

As depicted, system 400 includes an electric heater 412 as an additional heat source. System 400 is also illustrated as including an air mover 418 to promote circulation of air emitted by any one of heat exchanger unit 406, heat pump 408 and electric heater 412. Electric heater 412 and air mover 418 may be substantially similar to electric heater 110 and air mover 112 described above. As such, electric heater 412 and air mover 418 are not described in detail with respect to FIG. 4. It is recognized, however, that system 400 may include any appropriate number of electric heaters 412 and air movers 418. Such electric heaters 412 and air movers 418 may be arranged in series or in parallel. It is further recognized that electric heater 412 and air mover 418 may be considered optional components that may be omitted from system 400, in certain embodiments.

Various other modifications may be additionally or alternatively made to system 400. For example, though system 400 is described as including a single heat exchanger unit 406 and a single heat pump 408, system 400 may include any appropriate number of heat exchanger units 406 and heat pumps 408 for emitting heat to raise the temperature of the ambient air to the target temperature. Where multiple heat exchanger units are used, the heat exchanger units may be arranged in series or in parallel. Thus, water from faucet 404 may be directed to multiple heat exchanger units in parallel. Alternatively, water from faucet 404 may be directed to the multiple heat exchanger units in series. Likewise, where multiple heat pumps are used, the heat pumps may be arranged in series or in parallel with regard to the air stream. As still a further modification, water from faucet 404 may be directed to heat exchanger unit 406 and heat pump 408 in parallel rather than in series as shown.

As another example modification, though system 400 is described as including heat exchanger unit 406, this component may also be omitted from system 400 in certain embodiments. In some embodiments, heat exchanger unit 406 may be sufficient by itself to thoroughly heat the affected area 402 to the target temperature. Thus, where the temperature of water 405 is high enough and where heat pump 408 operates to efficiently and effectively increase the temperature of ambient air in affected area 402 to the target temperature, heat exchanger unit 406 may be omitted from system 400. In such an embodiment, water 405 may be transported directly from faucet 404 to heat pump 408. Heat pump 408 may then operate to first transfer the heat within water 405 to refrigerant 510 and then transfer the heat within refrigerant 510 to the ambient air. As another example modification, though the target temperature of affected area 402 may be a temperature that is greater than 120 degrees Fahrenheit, this is merely one example of a suitable temperature that may be used to effectively rid an affected area 402 of a bed bug or other insect infestation.

Figure 6:
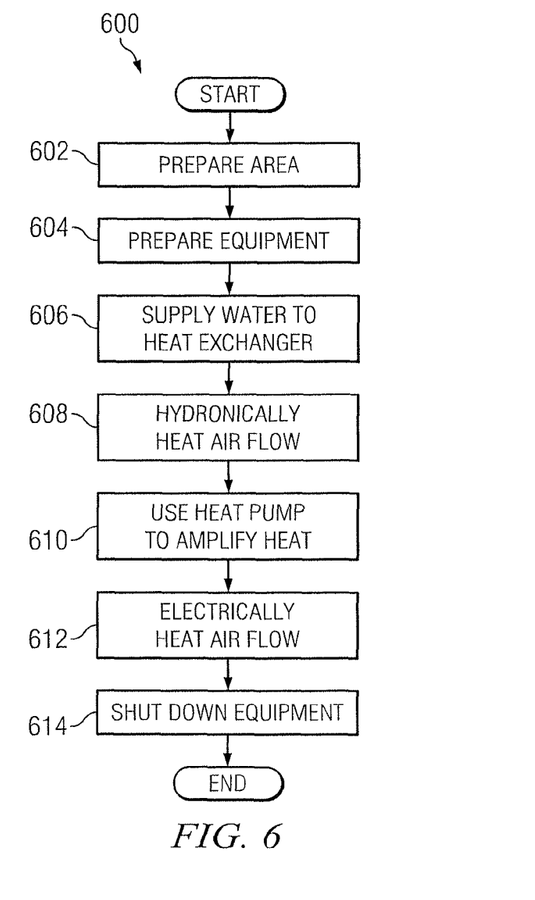
FIG. 6 illustrates an example heat pump method for pest control, according to certain embodiments of the present disclosure.

FIG. 6 illustrates an example heat pump method 600 for pest control, according to certain embodiments of the present disclosure. The method begins with the preparation of the affected area at step 602. As described above, preparing the affected area 402 may include capping any sprinkler heads with insulating caps. Additionally, preparing the affected area 402 may include removing heat sensitive contents from the affected area 402. Heat sensitive contents may include any material, equipment, or other contents that could be harmed by temperatures that reach or exceed approximately 120 degrees Fahrenheit. Items that fall within this category may be treated separately offsite.

At step 604, the equipment used in the treatment process is prepared. Preparation of the equipment may include positioning heat exchanger unit 406 and heat pump 408 within the affected area 402. Additionally, preparing the equipment may include connecting a hose to a faucet 404 and at least one of heat exchanger unit 406 and heat pump 408. Additionally, a hose 414 may be connected to heat pump 408 and then positioned proximate to drain 416. Further preparation of the equipment may include placing electric heater 412 and air mover 418 in the appropriate locations within affected area 402. Heat exchanger unit 406, heat pump 408, electric heaters 412, and air movers 418 may then be plugged into an electric supply and powered on.

Additional preparations may include the placement of one or more infrared and/or wireless thermometers within affected area 402. For example, infrared and/or wireless thermometers may be placed in the more insulated areas that are harder to thoroughly heat. For example, the thermometers may be placed in corners where poor air flow is anticipated. The thermometers may also be placed under furniture or under stacks of clothing or other soft articles. In certain embodiments, wireless thermometers may communicate wirelessly with one or more computers or other control centers. Wireless data-logging software may be used to record the internal temperature of affected area 402 both prior to and during the treatment process.

At step 606, water 405 is supplied to one or both of heat exchanger unit 406 and heat pump 408. Specifically, and as described above, a faucet 404 may be turned to the hottest setting and turned on at the fullest volume. The hot water 405 may then be transported from faucet 404 to one or both of heat exchanger unit 406 and heat pump 408. As described above, heat exchanger unit 406 operates to hydronically heat the ambient air in the affected area 402, at step 608.

Specifically, heat exchanger unit 406 may operate to increase the temperature of ambient air within affected area 402. In a particular embodiment, the heat exchanger unit 406 may transfer the heat in water 405 to the ambient air that is blown through heat exchanger unit 406.

In certain embodiments, heat exchanger unit 406 receives water 405 at a first temperature that may be equal to or greater than 45 degrees Fahrenheit. In contrast, the ambient air may be received by heat exchanger unit 406 at a second temperature. At the beginning of the treatment process, the temperature of ambient air that is received by heat exchanger unit 406 may be substantially equal to normal room temperature. In certain embodiments, the temperature difference between water 405 at the first temperature and the ambient air results in heat transfer from water 405 to the ambient air as it is blown through heat exchanger unit 406.

At step 610, heat pump 408 is used to amplify or boost the heat generated by heat exchanger unit 406. Specifically, heat pump 408 may receive water 405 after it is expelled by heat exchanger unit 406. The water may be received by heat pump 408 at a temperature that is slightly less than the temperature at which the water 405 was received by heat exchanger unit 406. For example, the water 405 may be received by heat pump 408 at a temperature that is approximately ten degrees less than the temperature at which water 405 was received by heat exchanger unit 406. Similar to heat exchanger 406, heat pump 408 may further transfer the heat within water 405 to air being blown through heat pump 408. Specifically, evaporator component 502 may transfer the heat within water 405 to refrigerant 510. A condenser component 504 may then transfer the heat within the refrigerant 510 to the air that is being emitted by heat pump 408.

At step 612, the air emitted by heat pump 408 is electrically heated. For example, an electrical resistance heater may be used to further increase the temperature of the ambient air within affected area 402. Electric heater 412 may operate to further increase the temperature of the air emitted by heat pump 408. One or more air movers 418 may then be used to promote the distribution of heated air that is emitted by heat exchanger unit 406, heat pump 408, and electric heater 412. The heated air may be cycled through the affected area and may be returned to heat exchanger unit 406 and/or heat pump 408 where it is again pushed through the components of system 400 to result in a further increase in the temperature of the air. Air may be circulated through system 400 in this manner until at least one of heat exchanger unit 406, heat pump 408, and electric heater 412 or some combination of these components results in the temperature of the ambient air being raised to the target temperature. As described above, a target temperature that is greater than 120 degrees Fahrenheit may be sufficient to kill bed bugs and other insects within affected area 402, in certain embodiments. In a particular embodiment, however, a target temperature of greater than 140 degrees Fahrenheit may be desired to ensure that the entire area and its contents are thoroughly heated to a temperature greater than the minimum temperature required. The equipment may be adjusted as needed until the target temperature is obtained. For example, equipment may be repositioned as needed to equalize the rate of heating across affected area 402. Additionally, where possible, the temperature of water 405 may be increased if more heat is desired within affected area 402.

After the target temperature has been maintained for a sufficient amount of time to result in the killing of the bed bugs and/or other pests, a shut down of the equipment may be initiated at step 614. For example, the flow of water 405 may be stopped. Heat exchanger unit 406, heat pump 408, and electric heater 412 may be turned off. Any remaining water 405 in system 400 may be drained out of the system components and routed to drain 416. To initiate the cooling of affected area 402 and its contents, air mover 418 may be repositioned. For example, an air mover 418 may be used to blow the heated air out of affected area 402. Additionally or alternatively, an air mover 418 may be positioned to blow air that is outside affected area 402 into the affected area. By switching the faucet 404 to cold water, hose 420 can deliver cold water 405 to heat exchanger unit 406 transferring heat from the ambient air to the water 405. This will cool the affected area quickly if the heated air can not be easily exhausted from the affected area. Any hoses coupling the system components may be removed when they have cooled enough to be comfortably handled. Finally, the equipment may be removed from affected area 402, and the contents of affected area 402 may then be returned to their original places.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for killing pests in an affected area of a structure, comprising:
    a heat pump unit placed within an affected area, the heat pump unit configured to:
        receive a flow of water from a faucet, wherein the faucet comprises one of a shower faucet and a sink faucet and the temperature of the flow of water is at leat 45 degrees Fahrenheit;
        generate heated air by transferring heat from the flow of water, the heated air being emitted into the affected area in order to raise the temperature of the affected area to a target temperature greater than 120 degrees Fahrenheit; and
    a thermostatic control configured to:
        monitor a temperature of a flow of water as it is received by the heat pump;
        monitor a temperature of air; and
        automatically cease operation of the heat pump when the temperature of the flow of water is above a predefined limit.

2. The system of claim 1, further comprising at least one electric heater positioned proximate to the heat pump unit, the at least one electric heater configured to further heat the heated air emitted by the heat pump unit.

3. The system of claim 1, further comprising:
    an inlet hose having a first end coupled to the faucet and a second end coupled to an inlet port of the heat pump unit; and
    an outlet hose having a first end coupled to an outlet port of the heat pump unit and a second end positioned proximate to a drain such that the flow of water may leave the heat pump unit via the outlet port and be discharged into the drain.

4. The system of claim 1, further comprising a heat exchanger unit positioned between the faucet and the heat pump unit, the heat exchanger unit being operable to:
    receive the flow of water from the faucet, the flow of water being received at a first temperature; and
    transfer heat from the flow of water received from the faucet to air flowing through the heat exchanger unit; and discharge the flow of water at a second temperature, the discharged flow of water being received by the heat pump unit.

5. The system of claim 4, further comprising:
a first hose having a first end coupled to the faucet and a second end coupled to an inlet port of the heat exchanger unit; and
a second hose having a first end coupled to an outlet port of the heat exchanger unit and a second end coupled to an inlet port of the heat pump unit.

6. The system of claim 4, wherein:
the faucet comprises a shower faucet or a sink faucet;
the first temperature is greater than 125 degrees Fahrenheit; and
the second temperature is at least 45 degrees Fahrenheit.

7. The system of claim 4, wherein, after the affected area is treated for pests, the heat exchanger unit is further configured to generate cool air by transferring heat from the air flowing through the heat exchanger unit to the flow of water received from the faucet.

8. The system of claim 1, wherein the structure comprises an apartment building and affected area comprises an apartment.

9. The system of claim 1, wherein the structure comprises a hotel and the affected area comprises a hotel room.

10. The system of claim 1, further comprising an air mover positioned proximate to the heat pump unit, the air mover being configured to direct heated air emitted by the heat pump unit along the floor of the affected area in order to prevent temperature stratification.

11. A system for killing pests in an affected area of a structure, comprising:
a heat pump unit placed within an affected area, the heat pump unit configured to:
receive a flow of water from a faucet;
generate heated air by transferring heat from the flow of water, the heated air being emitted into the affected area in order to raise the temperature of the affected area to a target temperature greater than 120 degrees Fahrenheit;
a thermostatic control configured to:
monitor a temperature of a flow of water as it is received by the heat pump; monitor a temperature of air; and
automatically cease operation of the heat pump when the temperature of the flow of water is above a predefined limit;
an inlet hose having a first end coupled to the faucet and a second end coupled to an inlet port of the heat pump unit; and
an outlet hose having a first end coupled to an outlet port of the heat pump unit and a second end positioned proximate to a drain such that the flow of water may leave the heat pump unit via the outlet port and be discharged into the drain.

12. The system of claim 11, further comprising a heat exchanger unit positioned between the faucet and the heat pump unit, the heat exchanger unit being operable to:
receive the flow of water from the faucet, the flow of water being received at a first temperature; and
transfer heat from the flow of water received from the faucet to air flowing through the heat exchanger unit; and
discharge the flow of water at a second temperature, the discharged flow of water being received by the heat pump unit.

13. The system of claim 12, further comprising:
a first hose having a first end coupled to the faucet and a second end coupled to an inlet port of the heat exchanger unit; and
a second hose having a first end coupled to an outlet port of the heat exchanger unit and a second end coupled to an inlet port of the heat pump unit.

14. The system of claim 12, wherein, after the affected area is treated for pests, the heat exchanger unit is further configured to generate cool air by transferring heat from the air flowing through the heat exchanger unit to the flow of water received from the faucet.

15. The system of claim 11, further comprising an air mover positioned proximate to the heat pump unit, the air mover being configured to direct heated air emitted by the heat pump unit along the floor of the affected area in order to prevent temperature stratification.

16. A system for killing pests in an affected area of a structure, comprising:
a heat pump unit placed within an affected area, the heat pump unit configured to:
receive a flow of water from a faucet;
generate heated air by transferring heat from the flow of water, the heated air being emitted into the affected area in order to raise the temperature of the affected area to a target temperature greater than 120 degrees Fahrenheit; and
a thermostatic control configured to:
monitor a temperature of a flow of water as it is received by the heat pump; monitor a temperature of air; and
automatically cease operation of the heat pump when the temperature of the flow of water is above a predefined limit;
a heat exchanger unit positioned between the faucet and the heat pump unit, the heat exchanger unit being operable to:
receive the flow of water from the faucet, the flow of water being received at a first temperature; and
transfer heat from the flow of water received from the faucet to air flowing through the heat exchanger unit; and
discharge the flow of water at a second temperature, the discharged flow of water being received by the heat pump unit
wherein, after the affected area is treated for pests, the heat exchanger unit is further configured to generate cool air by transferring heat from the air flowing through the heat exchanger unit to the flow of water received from the faucet.

17. The system of claim 16, further comprising:
an inlet hose having a first end coupled to the faucet and a second end coupled to an inlet port of the heat pump unit; and
an outlet hose having a first end coupled to an outlet port of the heat pump unit and a second end positioned proximate to a drain such that the flow of water may leave the heat pump unit via the outlet port and be discharged into the drain.

18. The system of claim 16, further comprising:
a first hose having a first end coupled to the faucet and a second end coupled to an inlet port of the heat exchanger unit; and
a second hose having a first end coupled to an outlet port of the heat exchanger unit and a second end coupled to an inlet port of the heat pump unit.

19. The system of claim 16, wherein:
the faucet comprises a shower faucet or a sink faucet;
the first temperature is greater than 125 degrees Fahrenheit; and
the second temperature is at least 45 degrees Fahrenheit.

* * * * *